INVENTORS
KURT R. MACHEIN
UWE W. REESE

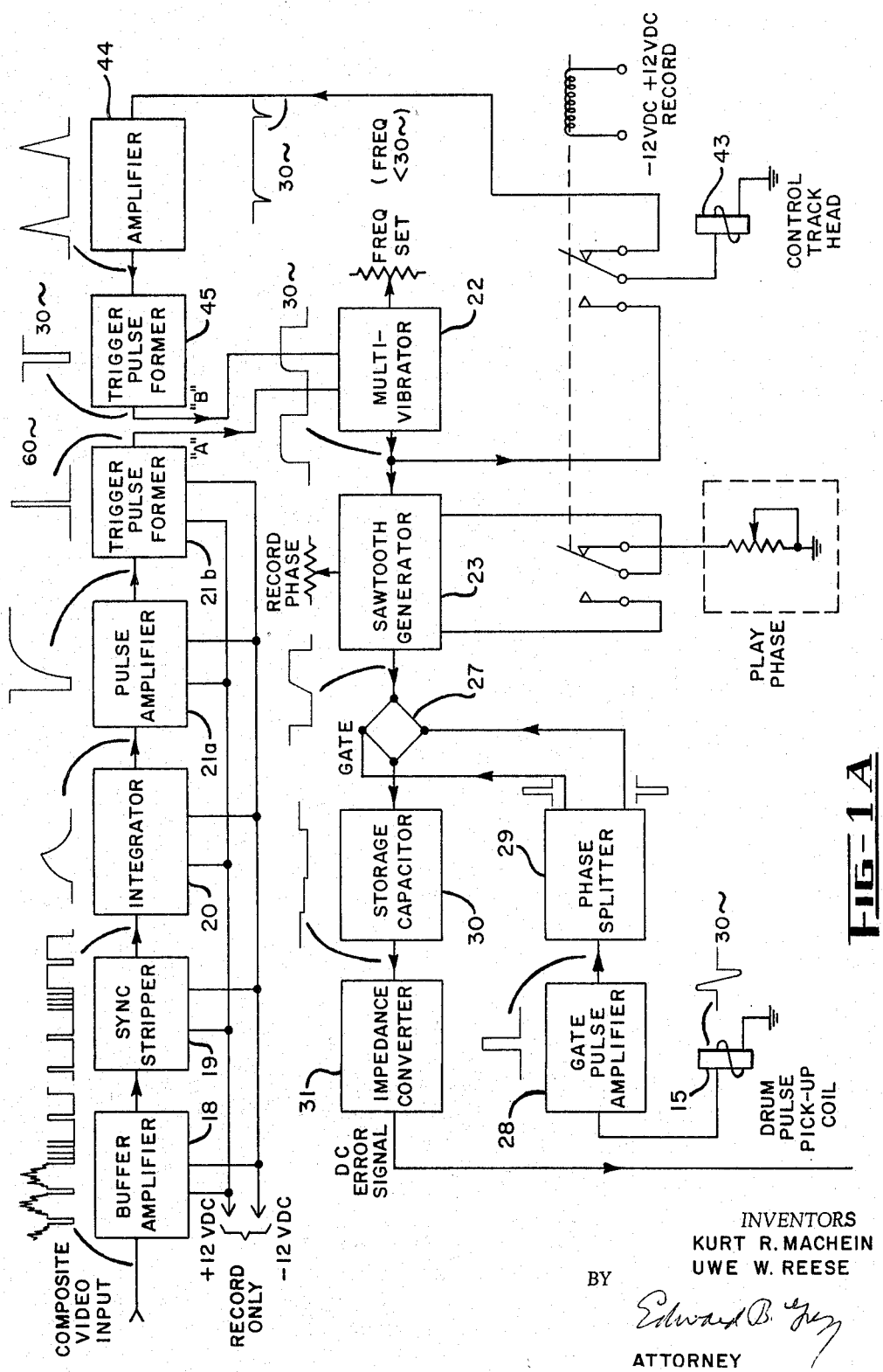

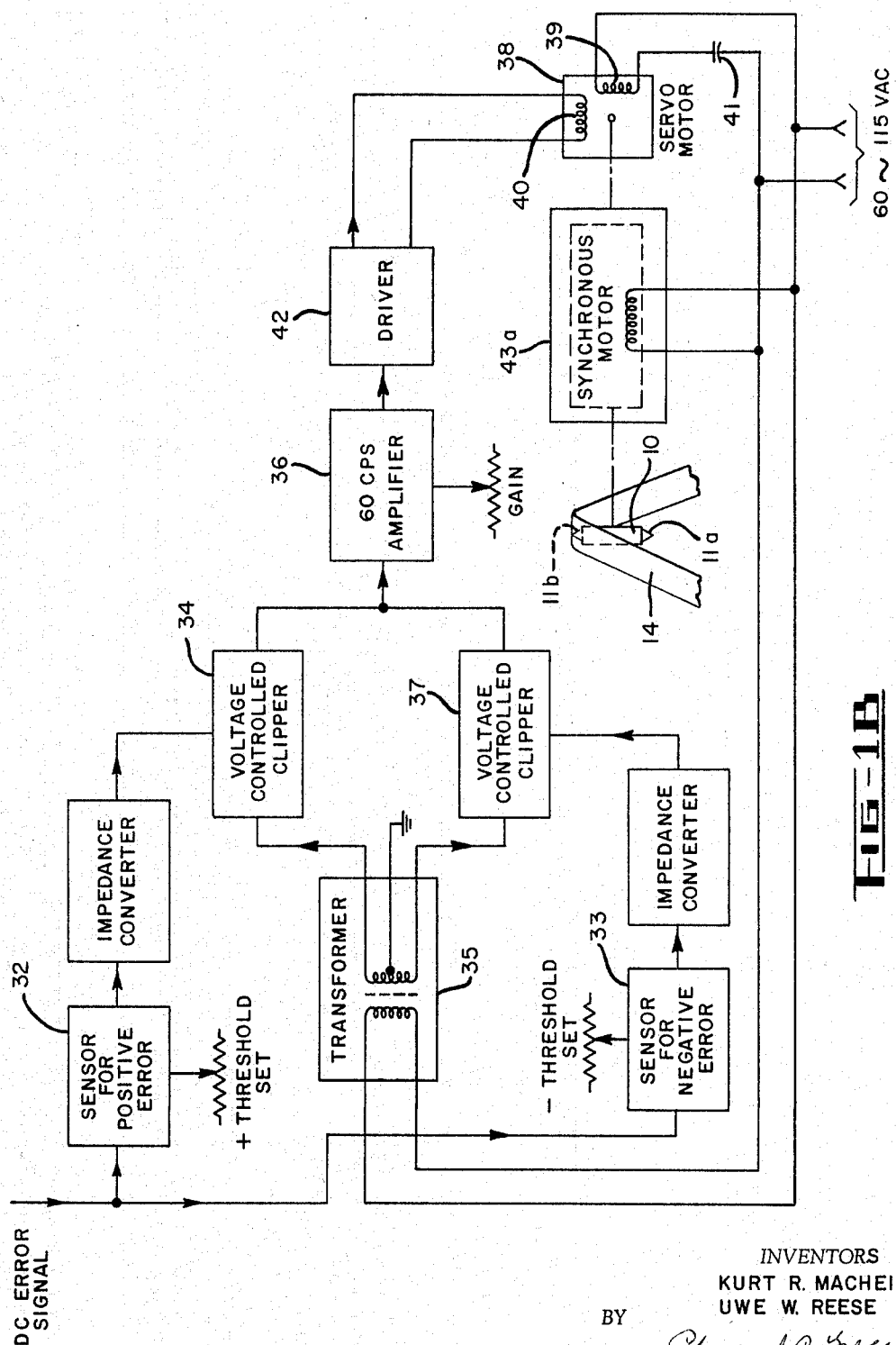

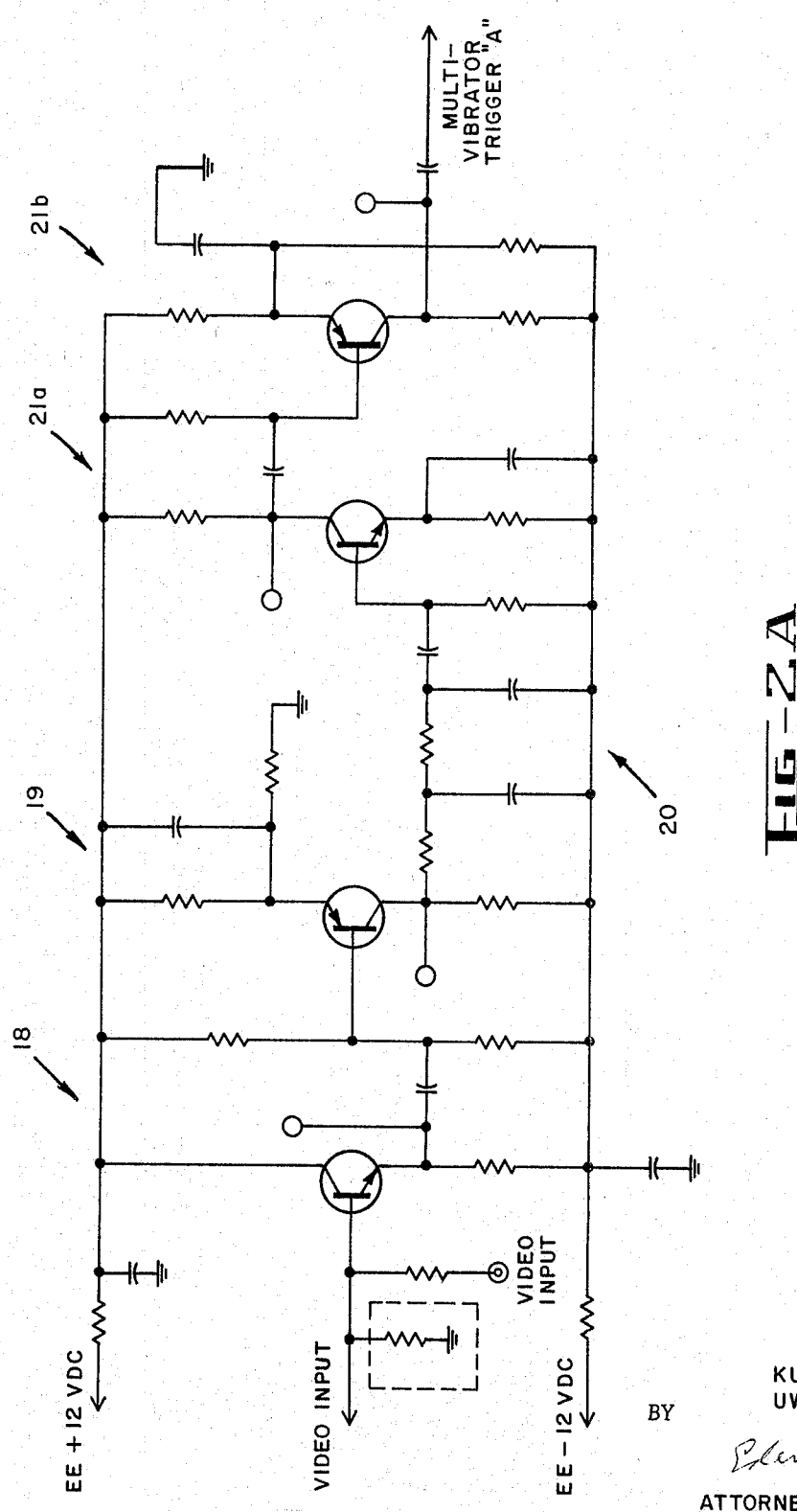

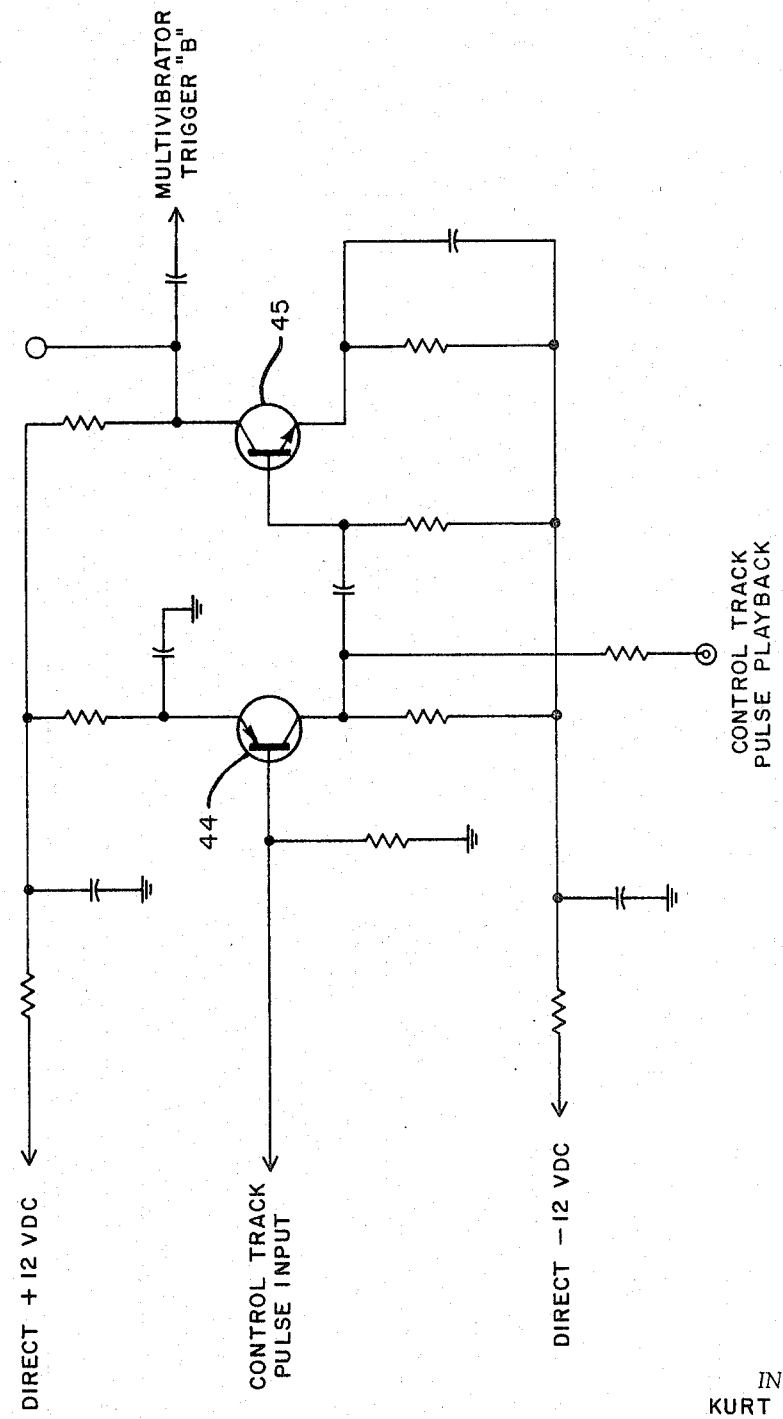

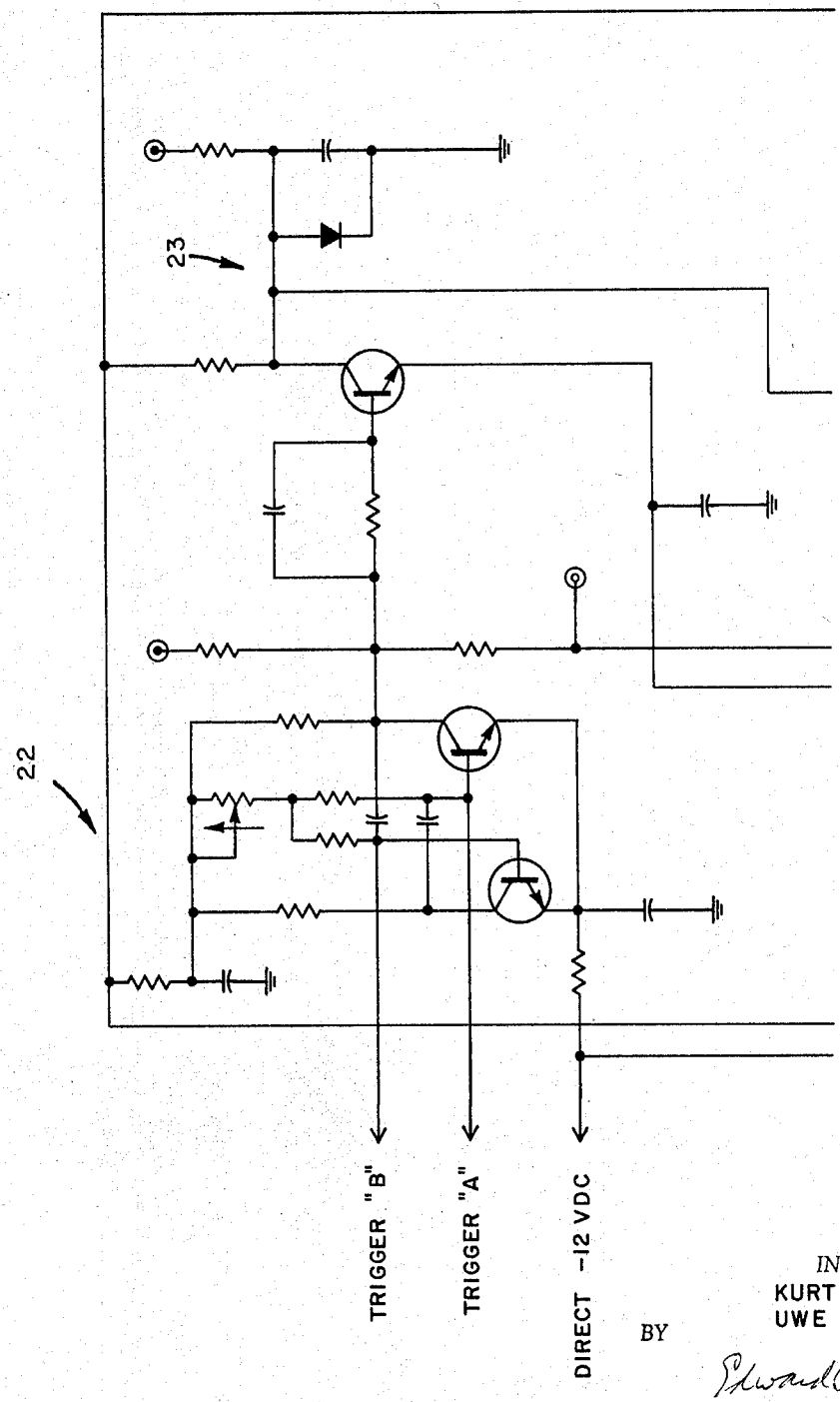

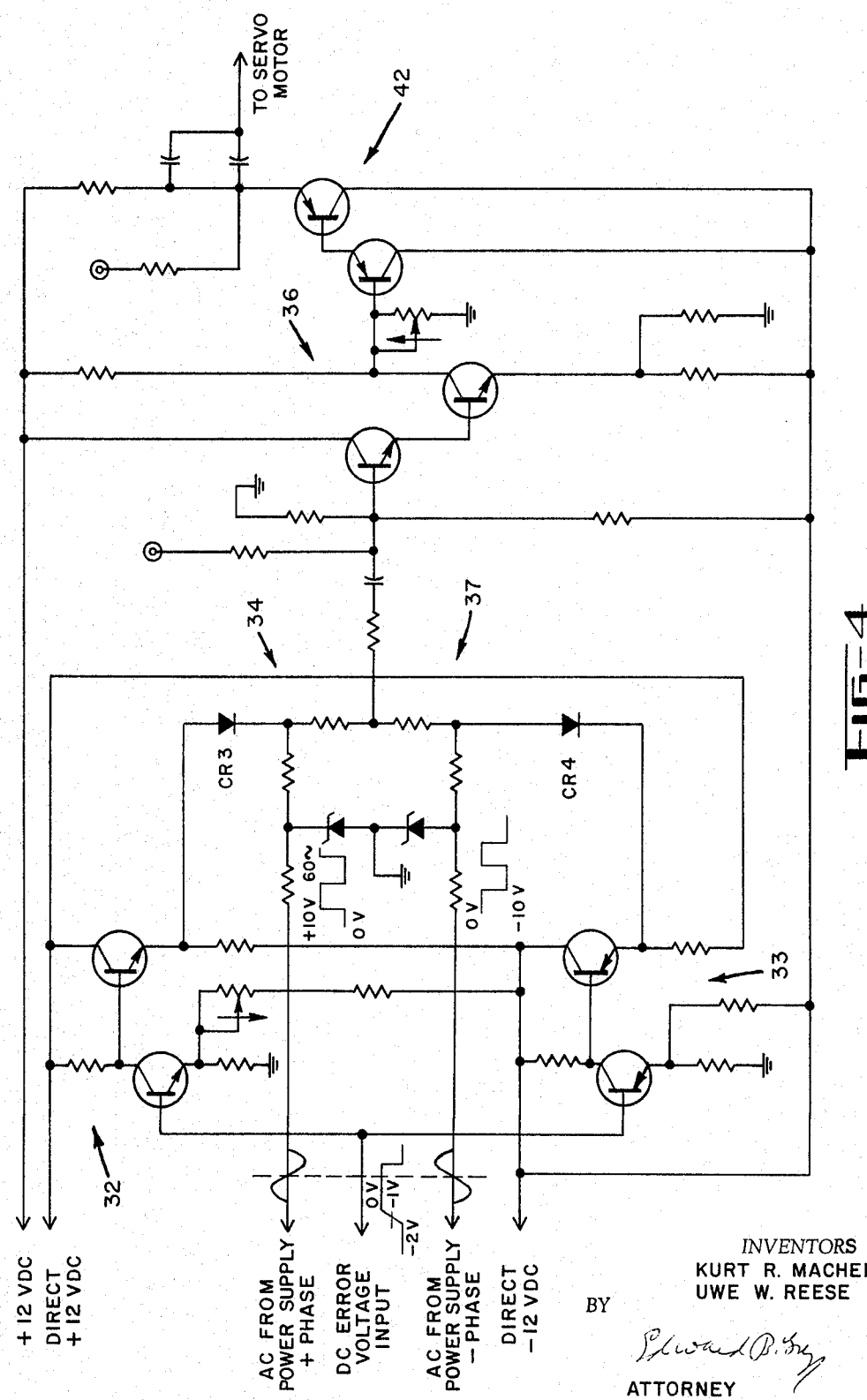

BY

ATTORNEY

# United States Patent Office 3,277,236
Patented Oct. 4, 1966

3,277,236
ROTARY SPEED AND PHASE CONTROL HAVING SYNCHRONOUS DRIVE MOTOR ROTATED BY CONTROL MOTOR
Kurt R. Machein, 3551 Grier, and Uwe W. Reese, 383 Maclane, both of Palo Alto, Calif.
Filed Feb. 11, 1963, Ser. No. 257,483
4 Claims. (Cl. 178—6.6)

The present invention relates to a control system for a rotary member, and more particularly relates to a control system for synchronizing a rotary member with a reference signal.

In the recording and reproducing of a video signal on magnetic tape, it is desirable to record the video signal transversely across the length of magnetic tape, e.g., at a diagonal thereacross, along successive tracks therealong. A rotary member such as a circular disc may be used having one or more heads (capable of both recording and reproducing) along the circumference thereof to traverse the magnetic tape in contact therewith and to either record or reproduce the signal containing the video information, while a capstan drives the magnetic tape at a constant speed. When reproducing the video signal from the magnetic tape, it is then desirable that the circular disc containing the heads accurately retrace the movement of the heads during recordation. If a complete single frame of a video signal is recorded along each track on the magnetic tape, then it is desirable that the rotary member be controlled to rotate so that a head thereon traverses each track during the time period of a single frame of a video signal. Accordingly, it is desirable to synchronize the rotation of the rotary member with a reference signal so that a complete video frame is recorded or reproduced from each track.

As a television signal has successive frames of video information separated by a vertical blanking period during which vertical synchronizing pulses exist, a suitable reference signal having a frequency determined by the vertical sync rate can be conveniently derived and used to control the rotation of the rotary member so that complete frames of video signals are recorded or reproduced along each track traversed.

The present invention relates to a control system for synchronizing the rotation of a rotary member with a reference signal. The described embodiment is suitable for recording and reproducing a video signal on magnetic tape and includes detecting means to derive a control voltage depending upon the synchronization of the rotary member with a reference signal, a synchronous motor to rotate the rotary member, and a servo motor controlled by said control voltage to rotate the housing of the synchronous motor to drive the rotary member toward synchronization with the reference signal.

In addition to synchronizing the rotary member with the reference pulses, the control system functions to maintain a desired phase relationship between the reference signal and an instantaneous reference position of the continuously rotating rotary member. That is, with the novel control system of this invention, not only is the speed of the rotary member synchronized with the reference signal, but a fixed phase relationship between the rotary member and the reference signal is maintained.

Other objects and advantages of the invention will become apparent from the following description and drawings. In the drawings, wherein the reference characters refer to the same parts in the several views:

FIGURES 1a and 1b together show a block diagram of a phase control system for a rotary member of an embodiment of this invention suitable for recording and reproducing a video signal on magnetic tape;

FIGURE 2a shows a schematic diagram of a circuit for deriving pulses during recordation in accordance with the vertical synchronization frequency of a video signal utilized as the reference signal in the embodiment shown in FIGURES 1a and 1b;

FIGURE 2b shows a schematic diagram of a circuit for deriving recorded pulses on a record track of magnetic tape during reproduction which are utilized as the reference signal in the embodiment shown in FIGURES 1a and 1b;

Figure 3B:
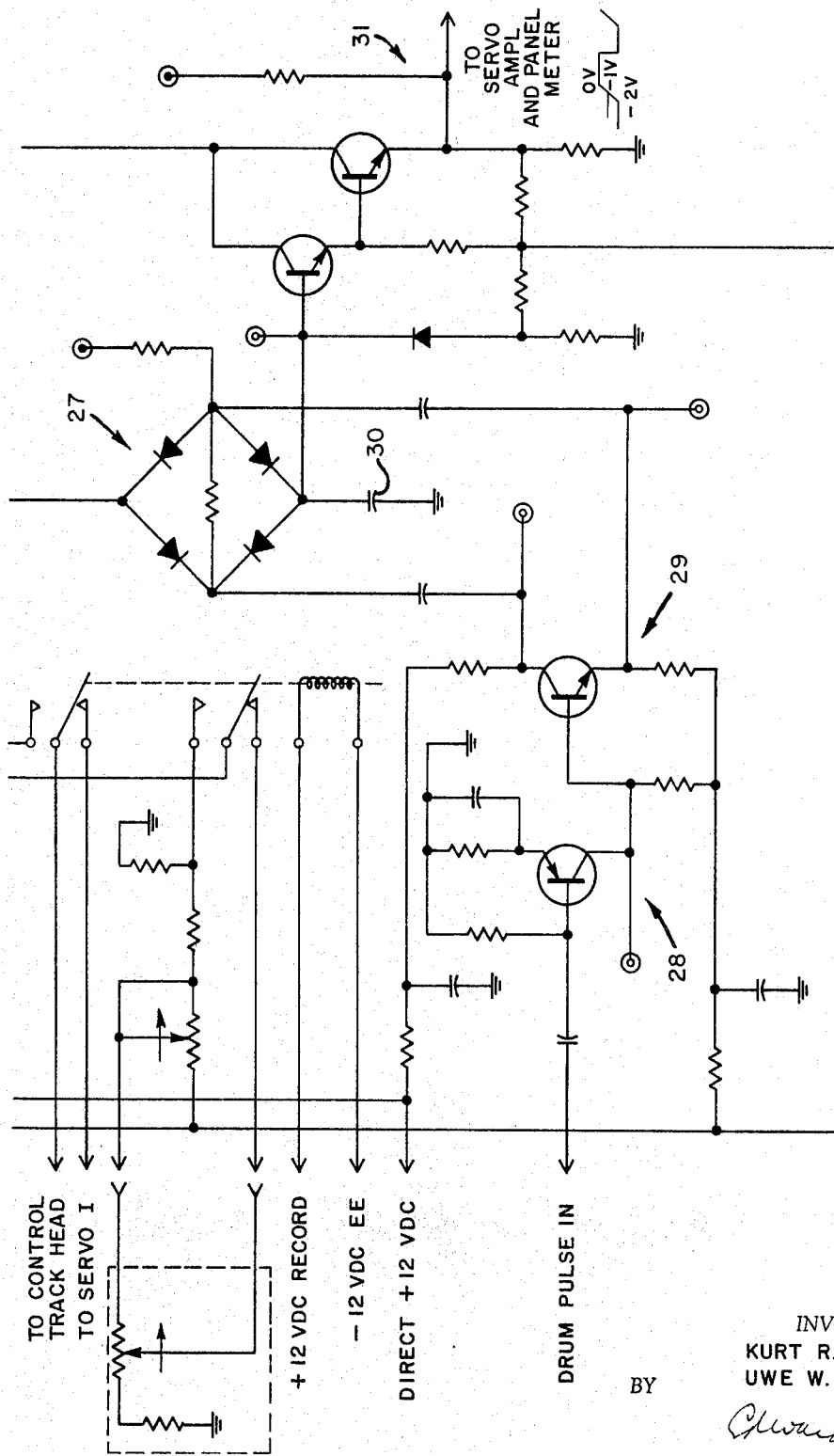
Figure 5:
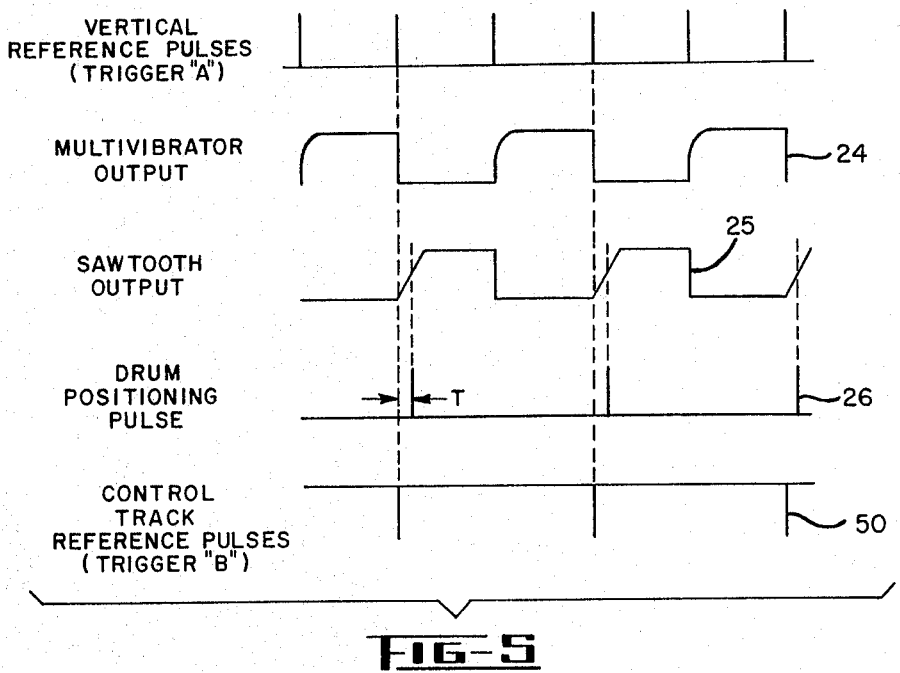
Figure 6:
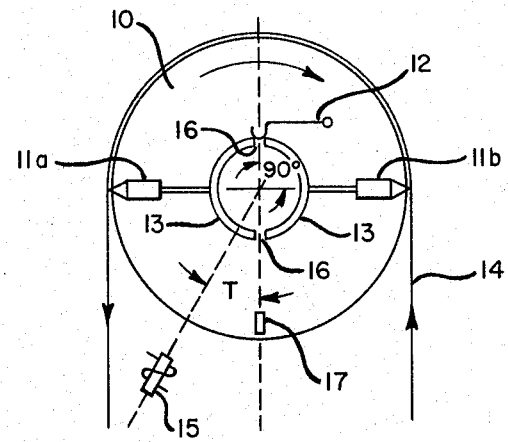
Figure 7:
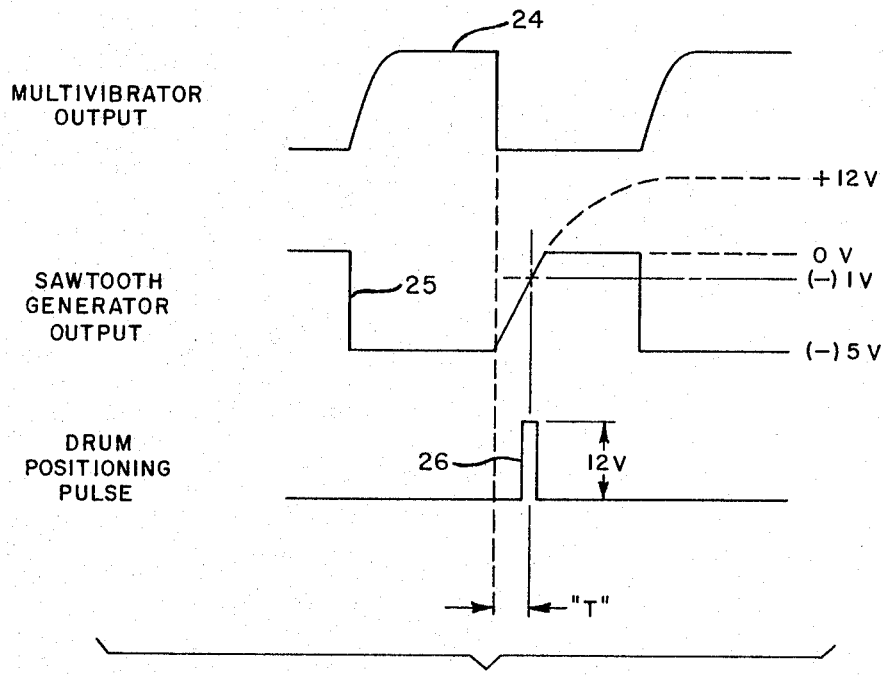
Figure 8:
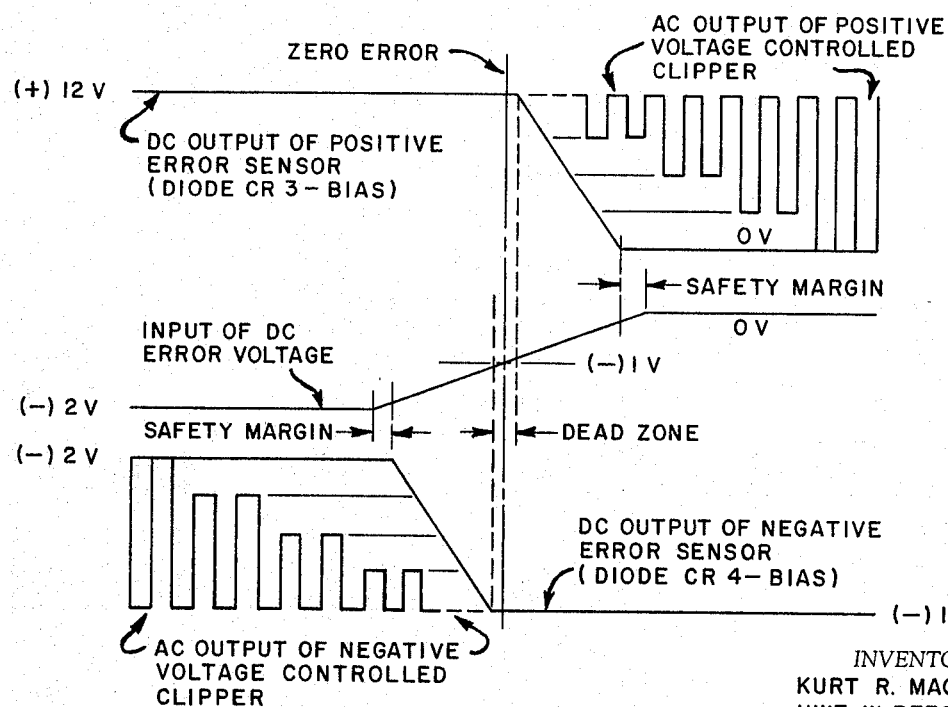

FIGURES 3a and 3b together comprise a schematic diagram of a sensing means included in the embodiment of FIGURES 1a and 1b to provide a D.C. signal during each cycle of rotation of the rotary member utilizing the pulses derived from the circuits of FIGURES 2a and 2b;

FIGURE 4 is a schematic diagram of a control means included in the embodiment of FIGURES 1a and 1b to produce an A.C. signal in accordance with the D.C. signal derived from the sensing means of FIGURES 3a and 3b;

FIGURE 5 is a waveform diagram illustrating the formation of a time varying voltage during each cycle of a reference signal utilized in the embodiment of this invention shown in FIGURES 1a and 1b;

FIGURE 6 shows a rotary member having a pair of video heads utilized with the embodiment of FIGURES 1a and 1b;

FIGURE 7 is a waveform diagram showing the electrical signals developed in the sensing means of FIGURES 3a and 3b representing the alignment of the rotary member with the reference signal; and FIGURE 8 is a graph showing the formation of a control A.C. voltage depending upon the D.C. signal derived from the circuitry shown in FIGURE 4.

Referring now to the figures, there is shown in FIGURES 1a and 1b a block diagram of a phase control system for a rotary member of an embodiment of this invention to be used with a magnetic tape recorder for recording and reproducing a video signal on a magnetic tape. As seen in FIGURE 6, the rotary member 10 of the magnetic tape recorder is a disc or narrow drum having two video heads 11a and 11b secured on opposite ends of a diagonal of said disc, each head being capable of recording or reproducing a video signal on magnetic tape. Rotary member 10 is driven by a synchronous motor (not shown in FIGURE 6) connected to an A.C. power source. A stationary brush 12 is positioned to have one end in contact with commutator slip rings 13 attached to rotate with the disc to allow a video information signal to be applied to or supplied from each of heads 11a and 11b alternately during each cycle of rotation of rotary member 10. The magnetic tape 14 is caused to move along its length by a capstan (not shown) so that each video head traverses consecutive diagonal tracks on magnetic tape 14 to record or reproduce a single frame of a video information signal on each track. A suitable tape drive and associated mechanism which may be employed for recording and reproducing information on a series of diagonal bands across the tape is shown in a copending patent application of Perry Alan Bygdnes, Serial No. 241,789, filed December 3, 1962, entitled "Tape Recorder." A stationary drum pulse pickup coil 15 is positioned at a predetermined angular position with respect to the shown position of the gaps 16 separating the commutator slip rings 13. When small permanent magnet 17 attached to one surface of rotary member 10 passes by pickup coil 15, a positioning impulse will be induced in pickup coil 15. Accordingly, during rotation of rotary member 10, means are provided to produce a positioning pulse at a predetermined position of rotary member 10.

This predetermined position of rotary member 10 is then to be synchronized with a reference signal which in this case is derived from the vertical synchronizing signal included in the composite video signal. Circuitry for forming such a reference signal during recordation is shown in FIGURES 1a and 1b and in more detail in FIGURE 2a. A composite video signal is applied to a buffer amplifier 18 and then to a sync stripper 19 which is a saturation amplifier that cuts off the video information of the composite video signal and passes the vertical synchronizing information to an integrator 20. Thereupon integrator 20 will produce a waveform having rising leading edge repeated at the vertical synchronizing rate. The beginning of this rising pulse represents the starting time of the vertical synchronizing pulses. In order to provide a sharp pulse at a predetermined interval after the start of the vertical synchronizing information, the rising integrated pulse is applied to a pulse amplifier 21a which is triggered at a selected voltage level of the integrated pulse representing a selected short period after the start of the vertical synchronizing signal. Pulse amplifier 21a produces a sharp rise time pulse at its leading edge when triggered by the selected voltage level of the integrated pulse. This sharp rise time pulse is applied to a trigger pulse former 21b to produce a sharpened pulse having a short duration say approximately 20 microseconds. Accordingly, there is now produced at the output of pulse former 21b a pulse of short duration that occurs during each vertical synchronization period of a video signal at a selected time after the beginning of vertical synchronizing period.

In order to produce a time varying voltage during every second vertical sync period, the output pulse of trigger pulse former 21b is applied to a multivibrator 22 to trigger both the leading and trailing edges of the square wave output thereof so that multivibrator 22 produces a square wave 24 (seen in FIGURES 5 and 7) at a rate equal to one-half of the vertical synchronization rate, or approximately thirty cycles per second. It will be noted that since the described rotary member 10 includes two video heads 11a and 11b, it is necessary to rotate rotary member 10 at one-half the rate of the vertical synchronizing rate in order to allow each head to record a single frame of a video signal along each diagonal track. For this reason, and as will be further evident hereinafter, multivibrator 22 is controlled at a rate equal to one-half of the vertical synchronizing rate. The output of multivibrator 22 is applied to a sawtooth wave former 23 to produce a sawtooth waveform sloping line commencing at the trailing edge of the square wave output of the multivibrator, as seen in FIGURES 5 and 7, and continuing for a small portion of the square wave output of multivibrator 22. In other words, one edge of the square wave output of multivibrator 22 is reformed by saw tooth waveformer 22 to have a gradual slope instead of an abrupt change from one extreme to another. The output of sawtooth waveformer is a waveform 25 (seen in FIGURES 5 and 7) which is flat and substantially constant on one level during one-half cycle, then increases at a fairly linear rate for a short period commencing at the next half cycle to another level and then is constant at this other level for the balance of the period of this waveform. When rotary member 10 is rotating in synchronization with the video vertical synchronizing rate, then its positioning pulse will occur during the sloping portion of the sawtooth waveform.

Thereupon, a rotary member positioning pulse and the reference signal in the form of a sawtooth modified square wave are applied to a sensing means to provide a D.C. signal representing the phase between the rotary member and the reference signal. The sensing means includes a bridge gate 27 and a storage capacitor 30. Waveform 25 from waveformer 23 is applied to the bridge gate 27. At the same time the positioning pulse 26 from drum pickup coil 15 is amplified by amplifier 28 and applied to phase splitter 29 to produce two equal positioning pulses of opposite polarity directed to bridge gate 27 to open it during the duration of the positioning pulse. When bridge gate 27 is opened, storage capacitor 30 is charged to the magnitude of the voltage of the reference signal in the form of waveform 25 existing during the application of positioning pulse. Storage capacitor 30 is then charged to the sampled voltage and substantially retains this voltage level until the next sampling voltage is obtained during the next cycle. Accordingly, the sensing means comprising bridge gate 27 and storage capacitor 30 provides a D.C. signal during each cycle of rotation of rotary member 10 commencing at its predetermined position and having an amplitude representing its phase with respect to said reference signal. During the interval of the sloping portion of waveform 25, the magnitude of the D.C. signal is proportional to the displacement of the rotary member with respect to said reference signal from a desired phase thereof. The D.C. signal of storage capacitor 30 is then fed through an impedance converter 31 to be applied to a control means to produce a controlled A.C. signal in accordance with the D.C. signal.

Referring now also to FIGURE 4, the control means includes a first sensor 32 and a second sensor 33 to produce a positive and a negative D.C. voltage, respectively, when the D.C. signal is above or below a predetermined or selected D.C. voltage level. First sensor 32 is connected to open a first gate (also called voltage controlled clipper) 34 when a positive D.C. voltage is applied thereto in order to allow a controlled A.C. power signal to be transferred from transformer 35 connected to an A.C. power source to power amplifier 36, the phase of the controlled A.C. voltage signal being the same as that of the A.C. power source, and the amplitude of the controlled A.C. voltage signal corresponds to the amount that the D.C. voltage exceeds the predetermined or selected D.C. voltage level. Similarly, second sensor 33 is connected to open a second gate 37 (also called voltage controlled clipper) when a negative D.C. voltage is applied thereto in order to allow a controlled A.C. signal to be transferred from transformer 35 to power amplifier 36, the phase of the controlled A.C. voltage signal now being 180° out of phase with respect to that of the A.C. power source, and the amplitude of this controlled A.C. voltage signal corresponds to the amount that the D.C. signal voltage is less than the predetermined or selected D.C. voltage level. It will be recalled that as the amplitude of the D.C. signal output of storage capacitor 30 represents the phase of rotary member 10 with respect to the reference signal, then it will be realized that the selected D.C. voltage level represents the desired alignment thereof. Accordingly, the aforedescribed control means produces an A.C. signal with the power source frequency having an amplitude representing the difference in the phase of the rotary member from the desired phase thereof with respect to the reference signal, and being either in or out of phase with the A.C. power source depending upon the direction of the phase error with respect to the desired phase. (See FIGURE 8 for an illustration of the waveforms produced by the control means.) The aforedescribed sensing means and control means comprise the detecting means to derive a control voltage representing the displacement of the rotary member with respect to a reference signal from a desired phase thereof.

It will be recalled that rotary member 10 is driven by a synchronous motor having a housing 43a shown in FIGURE 1b, connected to the line frequency of the A.C. power source. The armature of the synchronous motor rotates at a speed with respect to its housing at the line frequency rate. The synchronous motor used in this embodiment has a rotatable housing which is driven by servo motor 38 which has one winding 39 connected to the A.C. power source through 90° phase shifting capacitor 41, and another winding 40 connected to driver 42 which receives the controlled A.C. voltage signal from power amplifier 36. If the controlled A.C. voltage signal passes through first gate 34 to winding 40, servo motor 38 will rotate the housing 43a of the synchronous motor to change the effective speed of its armature to move the rotary member toward the desired synchronization with respect to the reference signal. When the positioning pulse derived from pickup coil 15 occurs repeatedly at a point on the sloping line of modified waveform 25 in FIGURE 7 so that the aforementioned predetermined or selected D.C. voltage level is sampled by storage capacitor 30, then the desired synchronization and phase of rotary member 10 with respect to the reference signal is present. In that case, no A.C. signal is applied to winding 41 of servo motor 38, and no torque will be developed therein so that the housing 43a of the synchronous motor will be stationary. If the sampled D.C. voltage is above or below the predetermined level, then servo motor 38 will receive a control A.C. signal to drive the housing 43a of the synchronous motor in a direction to properly phase the rotary member. It will be realized that the sloping line of waveform 25 provides a range of increased sensitivity which produces a large variance in control A.C. signal for relatively small variances from the desired alignment, in order to more accurately align the rotary member into the desired alignment.

In the case where the reference signal is not the same as the frequency of the local A.C. power source (e.g., crystal locked sync) a voltage will be sampled which is proportional to the frequency difference between the power line and vertical sync rate of the video signal. This voltage will actuate the servo motor to add to or subtract from the speed of the drum, so that the resulting frequency of rotation equals the vertical sync rate. Of course, in order to constantly produce the driving voltage for the servo motor, a certain amount of positioning error must remain. This remaining error is proportional to the frequency difference to be corrected for and its amount can be adjusted by the steepness of the sawtooth wave, in other words, by the gain of the servo loop.

In the described embodiment utilizing the control system of this invention, the predetermined D.C. voltage will be selected so that the switching interval of brush 12 across gaps 16 from one commutator slip ring 13 to the other occurs shortly after the beginning of and during the vertical synchronizing blanking period. In that event, the rotary member 10 having two heads to alternately record successive tracks on magnetic tape, will record complete frames of the video information signal on each of the tracks. Due to the generally symmetrical shape of the sawtooth waveform, the maximum angle for the required phase correction never exceeds approximately 180° rotation of the drum 10.

During the operation of recording the video information on magnetic tape, the reference signal was derived from the vertical synchronizing signal of the composite video information signal. In playback, it is desirable that the rotary member retrace the movement of its heads during recordation. It is therefore desirable to record a timing or reference signal on the magnetic tape such as along one edge thereof which can be reproduced to indicate the proper timing of the successive scans along the magnetic tape. For this reason, the reference signal in the form of the square wave output from multivibrator 22 is applied to control track head 43 during record which contacts a control track along the length of the magnetic tape to record the reference signal therealong. During the reproduction of the recorded video signal, the reference signal recorded on the control track is also reproduced to provide a reference signal, which reference signal takes the place of the reference signal derived from the video signal during recordation. For proper tracking during playback, such reference signal must bear the same phase relationship with the drum positioning pulses as existed between the vertical sync information and the positioning pulses during recordation. This is accomplished by recording the multivibrator 22 output on the tape during recordation.

Referring now also to FIGURE 2b, the reference signal picked up by control track head 43 is amplified by amplifier 44, clipped to remove its negative pulses, and applied to trigger pulse former 45 to produce a negative pulse during each cycle similar to the output pulse derived from trigger pulse former 21b during record. The negative pulse has a frequency rate of the desired rotation of rotary member during reproduction, and is applied to multivibrator 22 to produce square waves. The output of multivibrator 22 is applied to sawtooth waveformer 23 to produce a time varying voltage similar to that produced during record and having the sloping portion of waveform 25 commence the occurrence of the output pulse from pulseformer 45. The rest of the circuitry operates in the same manner as during record and will not again be described. Therefore, during playback the control system of this invention drives the rotary member into synchronization and phase with the reference signal derived from the control track on the magnetic tape. It will be noted that since the negative pulse derived from the control track during playback commences the sloping portion of sawtooth waveform 25 and corresponds to the output pulse during record that commenced the sloping portion of sawtooth waveform 25, the alignment control system of this invention will operate to align rotary member 10 so that the same head on rotary member 10 will reproduce the same track recorded by it during record.

Having now described the invention in detail in accordance with the requirements of the patent statutes, various changes and modifications will be suggested to those skilled in this art. It is intended that such changes and modifications shall fall within the spirit and scope of the invention as defined by the following claims.

We claim:

1. A system for maintaining synchronism between a rotary member and recurrent reference signal pulses comprising, a rotary member, a synchronous motor for continuously driving the rotary member, means generating positioning pulses at a frequency dependent upon the speed of rotation of the rotary member, sensing means connected to receive the positioning and reference signal pulses and providing a D.C. signal output representative of the time difference between the said pulses, control means connected to the D.C. output from the sensing means to produce an A.C. signal corresponding to said D.C. signal and derived from an A.C. power source, the said synchronous motor having both a rotatable housing and a rotatable armature, the rotatable armature being connected to the rotary member, said synchronous motor being connected to said A.C. power source to rotate the armature with respect to its housing at a speed determined by the frequency of said A.C. power source, a servo motor having two windings, one winding being connected to said A.C. power source, and the other winding being connected to the A.C. signal output from the said control means, said servo motor having an armature to rotate at a speed dependent upon the amplitude of said A.C. signal and in a direction dependent upon the phase relation of said A.C. signal with said A.C. power source, the armature of the servo motor being connected to rotate the housing of said synchronous motor in order to drive the rotary member into synchronism with the reference signal.

2. A control system for synchronizing a rotary member with a reference signal, said control system comprising: a rotary member; a synchronous motor having a rotatable housing and a rotatable armature connected to continuously rotate the rotary member; first means connected to said rotary member to derive a positioning pulse at an instantaneous predetermined position thereof; second means to derive a time varying voltage during each cycle of a reference signal; sensing means connected to said first and second means to provide a D.C.

signal having an amplitude dependent upon the time difference between the said positioning pulses and reference signal; control means connected to an A.C. power voltage source and to the sensing means to provide an A.C. signal derived from said A.C. power source that is either in or out of phase with that of the A.C. power voltage source and has an amplitude and either an in or out of phase relation with the A.C. power voltage source depending upon the difference in the direction and magnitude, respectively, of the D.C. signal voltage from that of a predetermined D.C. voltage; means connecting said synchronous motor to said A.C. power voltage source to rotate its armature with respect to its housing at a speed determined by the frequency of said A.C. power voltage source; and a servo motor having two windings, one winding being connected to said A.C. power voltage source, and the other winding being connected to receive the A.C. signal of the control means, said servo motor having an armature to rotate at a speed depending upon the amplitude of said A.C. power signal and in a direction depending upon the in or out of phase relation of the A.C. signal with said A.C. power source, the armature of said servo motor being connected to rotate the housing of said synchronous motor in order to drive the rotary member so that its instantaneous predetermined position is in a desired synchronism with the reference signal.

3. In a control system, a rotatable member, a synchronous motor for continuously driving the said rotatable member, positioning pulse generating means generating positioning pulses at a frequency dependent upon the speed of rotation of the rotatable member, a source of recurrent reference pulses, means generating a wave which includes a portion which varies in magnitude with time, means synchronizing the time varying wave with the said reference pulses, a storage circuit, a gating circuit for coupling the said time varying wave to the storage circuit during a gating period established by the positioning pulses, the output from the storage circuit comprising a D.C. signal having a magnitude dependent upon the time displacement of the reference and positioning pulses, a control circuit for converting the D.C. output from the storage circuit to an A.C. control signal, a servo motor having as a control signal the A.C. control signal from the control circuit, and means mechanically connecting the servo motor to the synchronous motor for control of the speed of the synchronous motor to thereby synchronize the rotatable member with the reference pulses.

4. In a control system, a rotatable member, a synchronous motor having a rotatable housing and a rotatable armature connected to said rotatable member to continuously rotate the same, a magnetic head secured to the rotatable member, a magnetic tape movable past the head in a manner whereby the head sweeps diagonally across the tape, positioning pulse generating means associated with the rotatable member and generating positioning pulses at a frequency dependent upon the speed of rotation of the rotatable member, a source of recurrent reference pulses, means generating a generally sawtooth wave, means synchronizing the generally sawtooth wave with the said reference pulses, a storage circuit, a gating circuit for coupling the generally sawtooth wave to the storage circuit during a gating period established by the positioning pulses, the output from the storage circuit comprising a D.C. signal having a magnitude dependent upon the time displacement of the reference and positioning pulses, means converting the D.C. output from the sensing means to an A.C. control signal, a servo motor having as a control signal the said A.C. control signal, and means mechanically connecting the said servo motor to the housing of the synchronous motor to drive the same and thereby control the rotation of the rotatable member.

References Cited by the Examiner

UNITED STATES PATENTS

| | | | |
|---|---|---|---|
| 3,016,428 | 1/1962 | Kabell et al. | 178—6.6 X |
| 3,022,383 | 2/1962 | Springer | 179—100.2 |
| 3,071,644 | 1/1963 | Olive | 178—6.6 |
| 3,179,752 | 4/1965 | Brenner | 179—100.2 |
| 3,179,870 | 4/1965 | Maxey | 318—172 |

DAVID G. REDINBAUGH, *Primary Examiner.*

H. W. BRITTON, *Assistant Examiner.*